US006870107B2

(12) United States Patent
Daume

(10) Patent No.: US 6,870,107 B2
(45) Date of Patent: Mar. 22, 2005

(54) DEVICE FOR ELECTRICALLY CONTACTING A SECTIONALLY INSULATED EXTERNAL CONDUCTOR OF A COAXIAL CABLE

(75) Inventor: Britta Daume, Burgwedel (DE)

(73) Assignee: Daume Patentbesitzgesellschaft mbH & Co. KG, Burgwedel (DE)

(*) Notice: Subject to any disclaimer, the term of this patent is extended or adjusted under 35 U.S.C. 154(b) by 0 days.

(21) Appl. No.: 10/466,581

(22) PCT Filed: Jan. 17, 2002

(86) PCT No.: PCT/EP02/00445

§ 371 (c)(1), (2), (4) Date: Jul. 18, 2003

(87) PCT Pub. No.: WO02/058192

PCT Pub. Date: Jul. 25, 2002

(65) Prior Publication Data

US 2004/0048505 A1 Mar. 11, 2004

(30) Foreign Application Priority Data

Jan. 19, 2001 (DE) .................................... 201 01 067 U

(51) Int. Cl.[7] ............................................... H02G 15/02

(52) U.S. Cl. ...................... 174/74 R; 174/75 C; 174/78

(58) Field of Search ................................ 174/74 R, 78, 174/84 R, 84 S, 85; 439/578, 98, 851, 852, 841, 842

(56) References Cited

U.S. PATENT DOCUMENTS 2,338,659 A * 1/1944 Morehouse ................ 248/74.3
2,425,153 A * 8/1947 Harrison ................ 174/40 CC
2,432,492 A * 12/1947 Tinnerman ............. 174/40 CC
4,613,191 A * 9/1986 Papa ........................... 439/99
4,659,870 A 4/1987 Jones
4,875,864 A * 10/1989 Campbell ................... 439/100
5,230,537 A * 7/1993 Newman .................... 285/112
5,919,065 A * 7/1999 Warner et al. .............. 439/789
6,297,447 B1 * 10/2001 Burnett et al. .......... 174/40 CC
6,422,900 B1 * 7/2002 Hogan ........................ 439/578
6,486,402 B2 * 11/2002 Harger et al. ................. 174/78
6,548,762 B2 * 4/2003 Jiles et al. ..................... 174/78

FOREIGN PATENT DOCUMENTS

DE 0 744 788 A1 * 5/1996 ............ H01R/4/64
EP 0 978 678 2/2000
GB 2 245 772 1/1992
RU 2068605 10/1996
WO WO 02/03501 1/2002

* cited by examiner

*Primary Examiner*—William H. Mayo, III
(74) *Attorney, Agent, or Firm*—Robert W. Becker & Associates; Robert W. Becker

(57) ABSTRACT

A device for electrically conductively contacting a sectionally shipped outer conductor of a coaxial cable is provided. The device includes a main body that can be clamped about the cable that is to be contacted. In a non-installed position, the main body is open in a circumferential direction to form ends, which are provided with angled-off or bent-away tongues made at least in part metal. In an installed position, sealing surfaces of elastic material are formed on surfaces of the tongues that face one another. In the installed position, the tongues can be interconnected by at least one screw or bolt. The device also includes a mechanism for limiting a screw-in extent of the screws such that a compression of the elastic material of the sealing surfaces is effected in a defined manner when the screws are tightened.

12 Claims, 4 Drawing Sheets

DEVICE FOR ELECTRICALLY CONTACTING A SECTIONALLY INSULATED EXTERNAL CONDUCTOR OF A COAXIAL CABLE

BACKGROUND OF THE INVENTION

The invention relates to a device for the electrical conductive contacting of a stripped outer conductor of a coaxial cable.

EP 0 744 788 A1 discloses a device of the pertaining type that has a main body that is embodied as a clamp that can be clamped about the cable that is to be contacted, with the main body being open in the circumferential direction and being provided at its ends with angled-off tongues, with sealing surfaces of elastic material being formed on those surfaces of the tongues that in the installed position face one another, whereby in the installed position of the device, the tongues are interconnected by screws. With the known device, the main body has a band-shaped metallic clamp that is embedded in elastic material, whereby on that side that in the installed position faces the object that is to be contacted, a contact surface is left exposed for a contact element for contacting the stripped region of the coaxial cable.

A drawback of the known device is that if during installation of the device on the coaxial cable the screws for connecting the main body are tightened with excessive force, the elastic material of the sealing surfaces on the tongues is compressed excessively and in a non-defined manner, resulting in the danger that the elastic material becomes damaged and the sealing surfaces thereby lose their sealing effect.

It is an object of the invention to provide a device that does not have the drawback of the known device and that thus reduces the danger that when the screw are tightened, the elastic material of the sealing surfaces will be excessively compressed.

SUMMARY OF THE INVENTION

The basic concept of the inventive teaching is that means for limiting the screw-in extent of the screws is provided such that a compression of the elastic material of the sealing surfaces is effected in a defined manner when the screws are tightened. This reliably prevents the elastic material of the sealing surfaces from being excessively compressed during tightening of the screws and thereby possibly becoming damaged. Rather, the compression of the elastic material is effected in a defined manner, whereby the amount of the compression can in a simple manner be as desired by appropriate dimensioning of the means for limiting the screw-in extent and hence the maximum possible screw-in extent.

As a consequence of the inventively provided means for limiting the screw-in extent, the installation of the inventive device is simplified and can hence also be readily carried out by inexperienced personnel.

The inventive device is straightforward and can hence be produced in an economical manner and have a sturdy construction.

The means for limiting the screw-in extent can, in conformity with the respective requirements, be embodied in any suitable manner, for example by having the thread of the screw end at an axial spacing from its head, so that the screw-in extent is limited by the length of the thread.

An extremely advantageous further development of the basic concept of the inventive teaching provides that the means for limiting the screw-in extent be formed by a stop means. This embodiment makes it possible in a particularly simple manner to limit the screw-in extent.

In conformity with the respective requirements, the stop can be disposed on the screw, especially can be formed on the screw, or the stop can be disposed on one of the tongues, in particular can be formed on one of the tongues. With the embodiment where the stop is formed on the screw or on one of the tongues, there is no need for an additional component to form the stop, so that the construction of the inventive device is further simplified and made more economical.

A further development of the embodiment where the stop is formed on one of the tongues provides that the stop be formed by at least one projection, which of one of the tongues extends in the axial direction of the screw, and is disposed on that side that in the installed position faces the head of the screw; the projection is formed such that at the end of the screw-in extent, the head comes to rest against the projection. With this embodiment, the projection can be formed, for example, by at least one nose or the like that is formed on the tongue.

Pursuant to a further development of the inventive teaching, the stop is formed by a disc or sleeve that surrounds the shaft of the screw, and that in the installed position is disposed between the head of the screw and the facing tongue. This embodiment has the advantage that not only for the screw but also for the disc that forms the stop, standard components can be utilized, so that also with this embodiment the inventive device is particularly easy and hence economical to manufacture.

In the installed position of the device, the screw expediently extends through a through bore that is formed in one of the tongues, and is screwed into a threaded bore that is formed in the other tongue.

If, for example, the main body of the inventive device is made of thin sheet metal, then to increase the stability, and to achieve an adequate depth, especially of the threaded bore, it is expedient for the tongues to be provided with reinforcing elements, preferably of metal, in which the bores are formed.

Pursuant to a further embodiment where the stop is formed on the screw, the screw is provided between its head and its threaded end with a thread-free region, the diameter of which is greater than the diameter of the thread such that a shoulder is formed, whereby the diameter of the through bore in the tongue corresponds to or is greater than the diameter of the screw in the region of the shoulder such that the axial end face of the shoulder in the screw-in position rests against that surface of the other tongue that faces this tongue.

BRIEF DESCRIPTION OF THE DRAWINGS

The invention will be explained in greater detail subsequently with the aid of the accompanying drawings, in which embodiments are illustrated.

Shown are.

DESCRIPTION OF PREFERRED EMBODIMENTS

Figure 1:
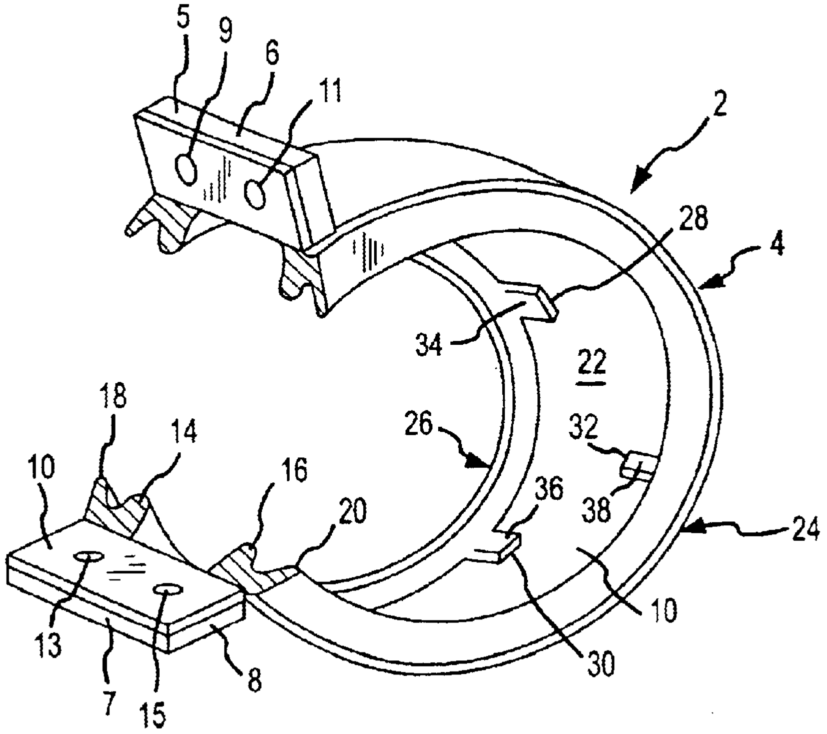
FIG. 1 in a schematic perspective view, a first embodiment of the inventive device in the form of a clamp, FIG. 2 a view of the radial inner surface of the device of FIG. 1 without the contact element, FIG. 3 in the same illustration as in FIG. 2, the device of FIG. 2 with a contact element secured to the main body, FIG. 4 a cross-sectional view taken along a line IV—IV through the device of FIG. 3 in the installed position, FIG. 5 in a schematic perspective view, the device of FIG. 1 in the installed position, FIG. 6 a very schematic radial cross-sectional view through the device of FIG. 1 in the installed position to clarify the basic principle of the inventive teaching, FIG. 7 a very schematic plan view and cross-sectional view of a reinforcing element provided with a stop, and FIG. 8 in the same illustration as in FIG. 7, a modification of the reinforcing element of FIG. 7.

In the figures of the drawings, the same or corresponding components are provided with the same reference numerals.

A first embodiment of an inventive device 2 is illustrated in FIG. 1 and has a flexible main body 4 that is embodied as a clamp and that in this embodiment is embodied as one piece and is open in the circumferential direction, and at its free ends has angled-off tongues 6,8 that in the installed position, in a manner that will be explained in greater detail subsequently, can be interconnected by screws or bolts that are not illustrated in FIG. 1.

Figure 4:
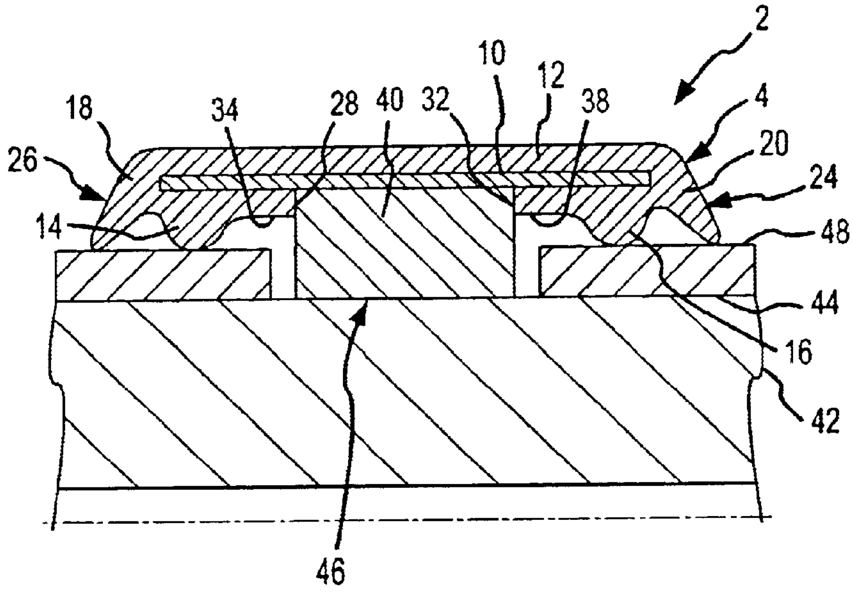

The main body 4 has a band-shaped metal portion 10, as well as a portion 12 of elastic material, in the embodiment an elastomer, in which the axial edges of the metal portion 10 are embedded and are thus connected with the portion 12 of elastic material (FIG. 4). The metal portion 10 extends in the peripheral direction right into the tongues 6,8 and, in this region, for stabilization, is reinforced with plate-shaped reinforcing elements 5,7 of metal that can, for example, be fused or welded with the metal portion 10. Formed in the tongue 9 are threaded bores 9, 11, and formed in the tongue 8 are through bores 13, 15, which, in a manner that will be explained in greater detail subsequently, serve to receive screws or bolts that are not illustrated in FIG. 1, and by means of which the tongues 6,8 can be interconnected in the installed position.

From FIG. 1 it cannot be seen, and therefore it will be here explained, that the surfaces of the tongues 6,8 that in the installed position face one another are provided with an elastic material, for example an elastomer, so that sealing surfaces are formed that in the installed position of the device 2 rest against one another in a sealing manner.

On that side that in an installed position faces a coaxial cable that is to be contacted, the portion 12 of elastic material forms sealing lips 14,16 and, in this embodiment, respective further sealing lips 18, 20 that in the axial direction are disposed outwardly of the sealing lips 14,16. In the installed position, the sealing lips 14,16 as well as the further sealing lips 18,20 of the main body 4 rest sealingly against an outer surface of the object that is to be contacted, so that a space that in the installed position is formed between the object that is to be contacted and the main body 4 is sealed off against penetration of air and/or moisture.

The device 2 furthermore has a contact element, which is not illustrated in FIG. 1, to establish an electrically conductive connection with the coaxial cable that is to be contacted; in the installed position, the contact element is held on that side of the main body that faces the coaxial cable that is to be contacted, in other words, in the embodiment of FIG. 1 on a radially inner surface 22 of the main body 4, which forms a support surface, with the contact element being held, for example, via an adhesive.

For the adjustment of the contact element during the manufacture of the device 2, the device 2 furthermore has adjustment aids for the contact element, which with this embodiment are formed by contact or abutment edges 28, 30, 32 that are formed on ribs 34, 36, 38 that in turn are formed on the sealing lips 14,16 of the portion 12 of elastic material.

The ribs 34,36 extend inwardly in an axial direction from the axial edge 24 of the main body 4, while the rib 38 extends in an axial direction inwardly from the opposite axial edge 24, whereby the ribs 34, 36 are disposed on a circumferential line 33, and the rib 38 is disposed on a circumferential line 35 that is axially offset relative to the circumferential line 33.

Figure 2:
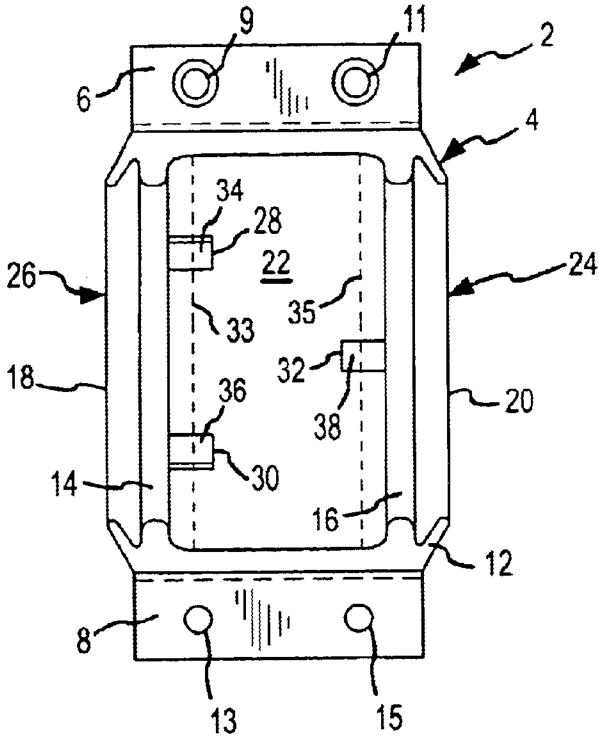

FIG. 2 is a view onto the radially inner surface 22 of the device 2.

Figure 3:
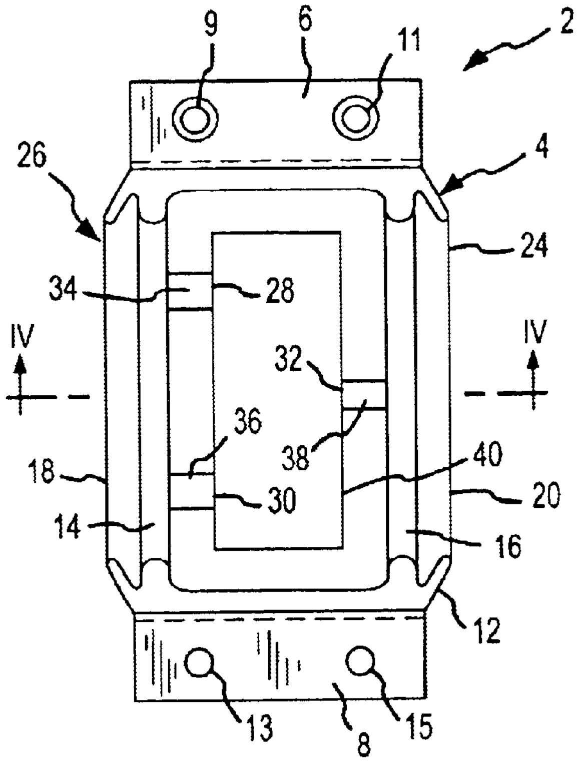

FIG. 3 shows the device 2 with a contact element 40 that is held thereon and that with this embodiment is comprised of electrically conductive graphite and in the plan view has an essentially rectangular configuration. The contact element 40 is connected by adhesive to the radially inner surface 22 of the main body 4 and is thus held thereon.

From FIG. 3 it can be seen that in the mounting position illustrated therein, oppositely disposed portions of the edge of the contact element 40 rest against the abutment edges 28, 30, 32 of the ribs 34, 36, 38, which form centering means for centering the contact element 40 between the oppositely disposed axial edges 24, 26 of the main body 4. The abutment edges 28, 30, 32 ensure that the contact element 40 is held on the main body 4, and does not project laterally beyond it in the desired position in which the long sides of the contact element extend essentially parallel to the axial edges 24, 26 of the main body 4.

FIG. 4 shows a cross-sectional view taken along the line IV—IV in FIG. 3, whereby the device 2 is illustrated in the installed position in which the main body 4 rests against a coaxial cable 42 that is to be contacted via the sealing lips 14, 16 and the further sealing lips 18, 20. To contact a sectionally stripped outer conductor 44 of the coaxial cable 42 in a contact region 46, the contact element 40 projects in a radial direction toward the coaxial cable 42 to such an extent that with the sealing lips 14, 16 and 18, 20 resting against a sheathing 48 of the coaxial cable 42, the contact element rests against the stripped outer conductor 44, which is recessed in a radial direction, and thus establishes an electrically conductive connection with the outer conductor.

Figure 5:
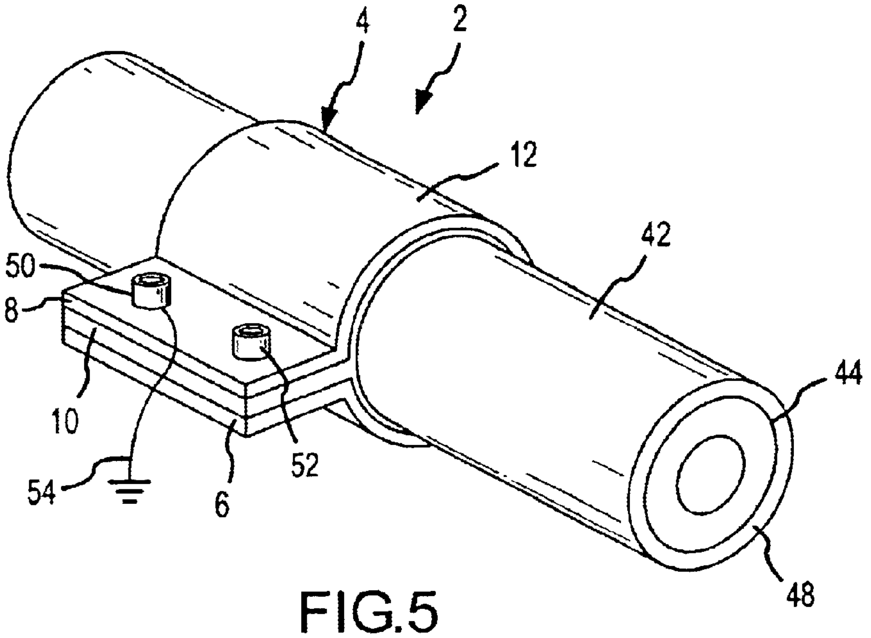

FIG. 5 shows the device 2 of FIG. 1 in the installed position in which the main body 4 extends about a coaxial cable 42 that is to be contacted in a sleeve-like manner. To secure the device 2 to the coaxial cable 42, an axial portion of the coaxial cable is first stripped, and subsequently the main body 4, which is embodied as a clamp, is clamped about the coaxial cable 42 that is to be contacted by means of metal screws or bolts 50, 52 that extend through the through bores 13, 15 formed in the tongue 8 and engage in the threaded bores 9, 11 formed in the tongue 6.

During the clamping of the main body 4, the sealing lips 14, 16 and the further sealing lips 18, 20 come to rest sealingly against the sheathing 48 of the coaxial cable 42, so that the sealing lips seal off the space that in the installed position is formed between the coaxial cable 42 and the main body 4 against the penetration of air and/or moisture. In the circumferential direction of the main body 4, this space is sealed as a result of the sealing surfaces, which are formed on the tongue 6,8, coming to rest sealingly against one another, whereby the elastic material of the sealing surfaces is pressed together or compressed.

During the clamping of the main body 4, the contact element 40 furthermore comes to rest against the stripped outer conductor 44 of the coaxial cable 42, so that by means of the contact element 40 an electrically conductive connection is established between the outer conductor 44 and the metal portion 10 of the main body 4. Since the metal portion 10 extends right into the tongues 6,8, it is possible via the screws 50, 52 to establish an electrically conductive connection to a conductor, for example a grounding cable 54 which is schematically indicated in FIG. 5. For this purpose, the grounding cable 54 can be connected with the screw 50 by a connecting eye. There is thus established in the desired manner an electrically conductive connection between the grounding cable 54 and the outer conductor 44 of the coaxial cable 42, so that this outer conductor 44 is grounded.

In order during tightening of the screws 50, 52 to avoid an excessive compression of the elastic material of the sealing surfaces, means are provided pursuant to the invention for limiting the screw-in extent of the screws 50, 52, as will be explained in greater detail subsequently with the aid of FIG. 6.

Figure 6:
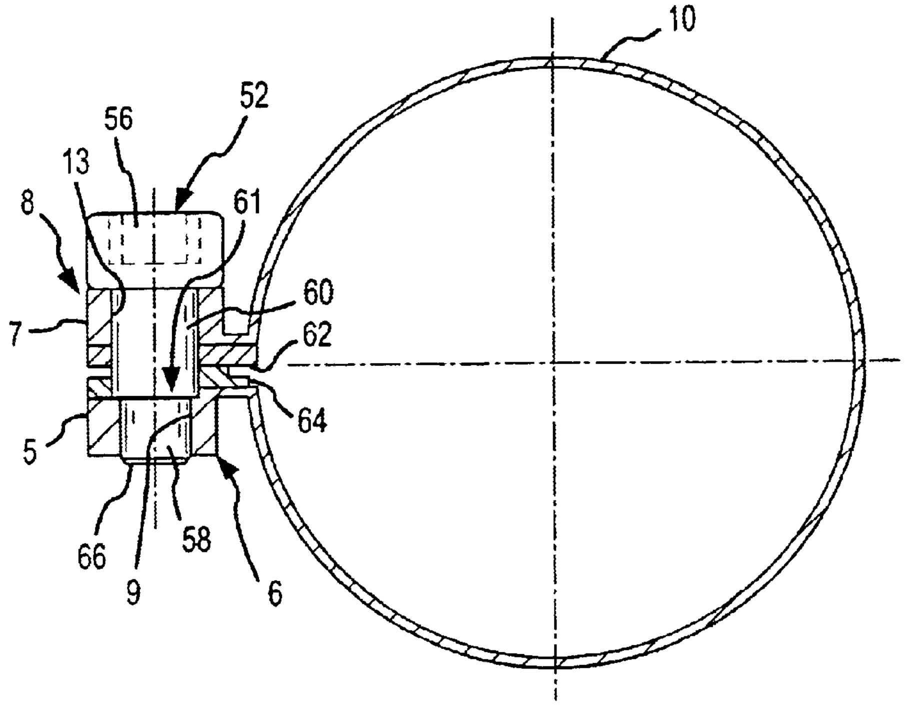

FIG. 6 shows in a very schematic manner a radial cross-section through the device 2 in the installed position in the region of the screw 52, whereby for purposes of simplification, merely the metal portion 10, the reinforcing elements 5, 7 and the screw 52 are illustrated, with the remaining parts of the device 2 being left off. For reasons of illustration, the thickness of the reinforcing elements 5, 7 is exaggerated.

As can be seen from FIG. 6, the screw or bolt 52, in the axial direction between its head 56 and its threaded end 58, has a thread-free region 60, the diameter of which is greater than the diameter of the thread such that in the screw-in direction, at the front of the region 60, a shoulder 61 is formed. The screw or bolt 50, which cannot be seen in FIG. 6, has a comparable configuration.

The diameter of the through bore 13 in the tongue 8 is, for receiving the screw 52, somewhat greater than the diameter of the thread-free region 60 of the screw 52, while its threaded end 58 can be screwed into the threaded bore 9.

When the screw 52 is screwed into the threaded bore 9, the tongues 6, 8 are secured with one another, whereby the elastic material of the sealing surfaces, which is designated with the reference numerals 62, 64 in FIG. 6, is compressed or pressed together. When a maximum screw-in extent, which is determined by the axial spacing of the axial end face of the shoulder 61 from the free end of the screw 52, is achieved, the end face of the shoulder 61 comes to rest in a defined manner against that side of the reinforcing element 5 of the tongue 6 that faces the tongue 8 in the manner of a stop, so that a further screwing-in of the screw 52, and hence a further compression of the elastic material 62, 64 of the sealing surfaces, is prevented.

As a consequence of the stop, the screw-in extent is limited, so that the amount of the compression of the elastic material is also limited. An excessive compression is thus reliably prevented.

The amount of the compression can be as desired based on the axial spacing of the axial end face of the shoulder 61 from the free end 66 of the screw 52.

Figure 7:
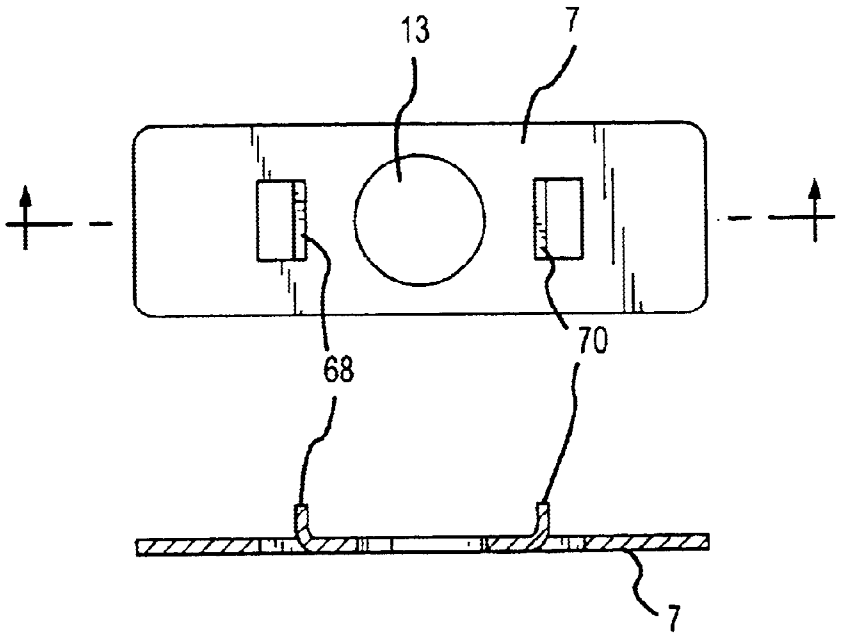

FIG. 7 illustrates a further embodiment of a stop means for limiting the screw-in extent. In this embodiment, the stop is formed by projections or noses 68, 70 that are stamped out of the reinforcing element 7 and are thus formed on the tongue 8. The noses 68, 70 extend axially beyond the reinforcing element in the direction toward the head of a non-illustrated screw.

In contrast to FIGS. 1–6, the connection of the tongues 6, 8 is effected with only a single screw, so that the tongue is provided with merely one through bore 9. When being screwed into the threaded bore 13, the non-illustrated screw, upon achieving a screw-in extent that is predetermined by the axial length of the nose 68, 70, comes to rest against the noses 68, 70 via the front end face, as viewed in the screw-in direction, so that in this manner the screw-in extent and hence the amount of compression of elastic material of the sealing surfaces is limited.

Figure 8:
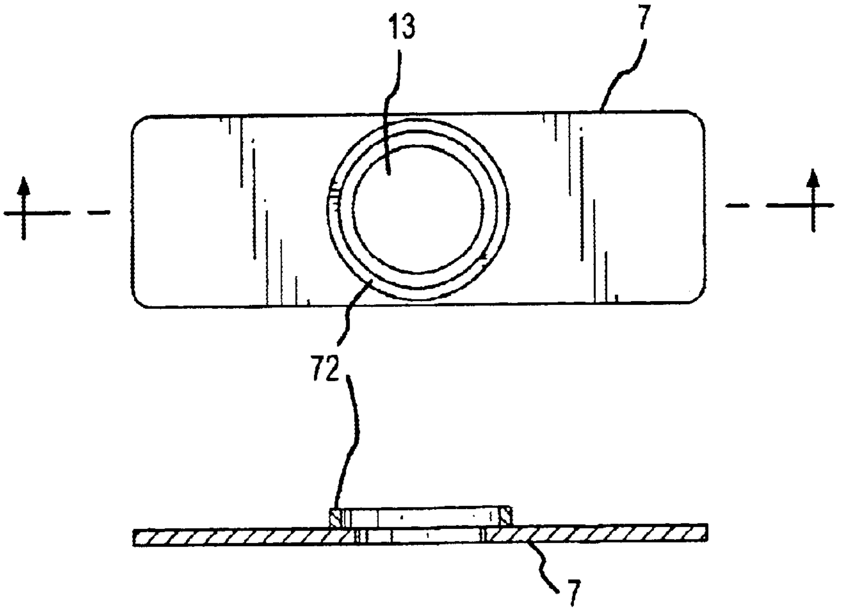

FIG. 8 illustrates a modification of the embodiment of FIG. 7, whereby the stop is formed by a disc 72 that is coaxial to the non-illustrated screw. The disc 72 can be fixedly connected with the reinforcing element 7 or can be placed loosely thereon.

The specification incorporates by reference the disclosure of German priority document 201 01 067.4 filed Jan. 19, 2001 and PCT/EP02/00445 filed Jan. 17, 2002.

The present invention is, of course, in no way restricted to the specific disclosure of the specification and drawings, but also encompasses any modifications within the scope of the appended claims.

What is claimed is:

1. A device for electrically conductively contacting a sectionally stripped outer conductor of a coaxial cable, comprising:

a main body that can be clamped about the cable that is to be contacted, wherein in a non-installed position said main body is open in a circumferential direction to form ends, wherein said ends of said main body are provided with angled-off or bent-away tongues made at least in part of metal, wherein in an installed position sealing surfaces of elastic material are formed on surfaces of said tongues that face one another, and wherein in said installed position said tongues can be interconnected by at least one screw or bolt; and means for limiting a screw-in extent of said at least one screws or bolt such that a compression of said elastic material of said sealing surfaces is effected in a defined manner upon tightening of said at least one screw or bolt, wherein said means for limiting said screw-in extent of said at least one screw or bolt is provided with a stop means.

2. A device according to claim 1, wherein said stop means is disposed on said at least one screw or bolt.

3. A device according to claim 2, wherein said stop means is formed on said at least one screw or bolts.

4. A device according to claim 1, wherein said stop means is disposed on one of said tongues.

5. A device according to claim 4, wherein said stop means is formed on one of said tongues.

6. A device according to claim 5, wherein said stop means is formed by at least one projection that extends in an axial direction of said at least one screw or bolt, wherein said projection is disposed on that side of one of said tongues that in said installed position faces a head of said at least one screw or bolt, and wherein at the end of a screw-in extent, said head of said at least one screw or bolt comes to rest against said projection.

7. A device according to claim 1, wherein said stop means is formed by a disc or sleeve that in said installed position surrounds a shaft of said at least one screw or bolt and wherein in said installed position said disc or sleeve is disposed between said head of said at least one screw or bolt and a facing one of said tongues.

8. A device according to claim 1, wherein in said installed position said at least one screw or bolt extends through a through bore formed in one of said tongues and is adapted to be screwed into a threaded bore formed in the other of said tongues.

9. A device according to claim 8, wherein said tongues are provided with reinforcing elements in which said bores are formed.

10. A device according to claim 9, wherein said reinforcing elements are made of metal.

11. A device according to claim 9, wherein said at least one screw or bolt between a head thereof and a threaded end thereof, is provided with a thread-free region having a diameter that is greater than a diameter of the thread of said at least one screw or bolt to thereby form or shoulder, whereby a diameter of said through bore in said one tongue corresponds to or is greater than a diameter of said at least one screw or bolt, in the region of said shoulder, and wherein an axial end face of said shoulder, in a screwed-in position, rests against a surface of said other one of said tongues that faces said one tongue.

12. A device according to claim 1, wherein to connect said tongues with one another, at least two of said at least one screw or bolts are provided, and wherein a respective stop means is associated with each of said screw or bolt.

* * * * *

UNITED STATES PATENT AND TRADEMARK OFFICE

CERTIFICATE OF CORRECTION

PATENT NO. : 6,870,107 B2
DATED : March 22, 2005
INVENTOR(S) : Daume

It is certified that error appears in the above-identified patent and that said Letters Patent is hereby corrected as shown below:

Title page,
Item [57], ABSTTRACT, should read as follows:
-- [57] ABSTRACT: A device for electrically conductively contacting a sectionally stripped outer conductor of a coaxial cable is provided. --

Signed and Sealed this

Twenty-fourth Day of May, 2005

JON W. DUDAS
*Director of the United States Patent and Trademark Office*